Aug. 8, 1961     M. A. USAB     2,995,336

BALL VALVE

Filed July 18, 1957

INVENTOR.
MARTIN A. USAB
BY John Joseph Hall
ATTORNEY

United States Patent Office

2,995,336
Patented Aug. 8, 1961

2,995,336
BALL VALVE
Martin A. Usab, Costa Mesa, Calif., assignor, by mesne assignments, to Consolidated Thermoplastics Company, Stamford, Conn., a corporation of Delaware
Filed July 18, 1957, Ser. No. 672,670
2 Claims. (Cl. 251—163)

This invention relates to improvements in the design of ball valves. Heretofore, ball valves had shortcomings inherent in their design and structure which have not been successfully overcome. A major shortcoming in existing types of ball valves is the inability of such valves to be adjusted to compensate for wear while in operation. Moreover, the design and construction of such ball valves do not permit easy adjustment to compensate for wear even after the valve is removed from operation.

Furthermore, existing ball valves continue to use conventional stem arrangements requiring a stem bonnet, nuts, bolts, the cutting of threads in the valve body, and the manufacture of separate bonnet units and nuts to secure the stem. Such stem arrangements are very costly to manufacture, since they require expensive materials and are difficult to assemble and disassemble, thereby substantially increasing the cost of conventional ball valves.

Another important shortcoming of existing ball valves is the difficulty of assembly and disassembly of the entire valve. The manufacture of such valves requires expensive processing methods, thereby resulting in a high cost of the valve.

An object of my invention is to provide a ball valve which can be easily assembled and disassembled.

Another object of my invention is to provide a ball valve which can be easily manufactured.

A further object of my invention is to provide a ball valve in which wear in operation can be readily compensated for by exterior adjustment of the valve while still in service, thus dispensing with the need for interrupting operations using the valve.

A still further object of my invention is to provide a ball valve with parts capable of being constructed of various materials such as plastics, metals, and ceramics.

A still further object of my invention is the provision for a stem arrangement for rotation of the ball which dispenses with the need for conventional stem bonnets, nuts, bolts, and packing glands, thereby substantially decreasing the cost of manufacture of the valve as well as greatly facilitating the assembly and disassembly of the valve.

These and other objects will be more readily understood by reference to the following description and claims, taken in conjunction with the accompanying drawing, forming a part hereof, in which FIGURE 1 is a vertical longitudinal section of the valve in the open position.

Figure 1:
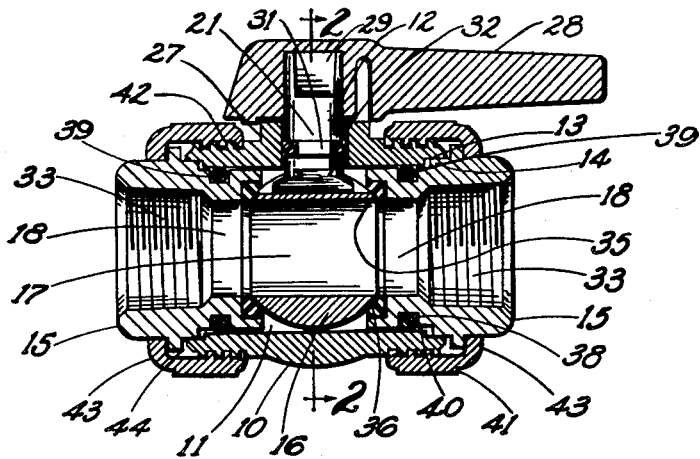
Figure 2:
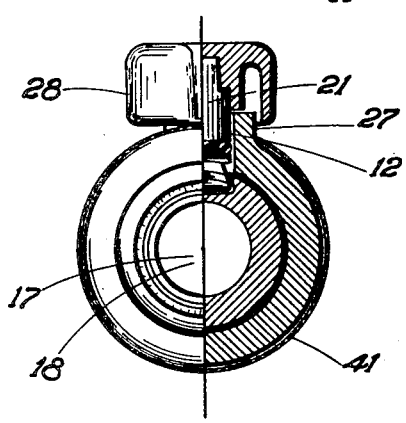
FIGURE 2 is a quarter section end view in the direction of line 2—2 of FIGURE 1.
Figure 3:
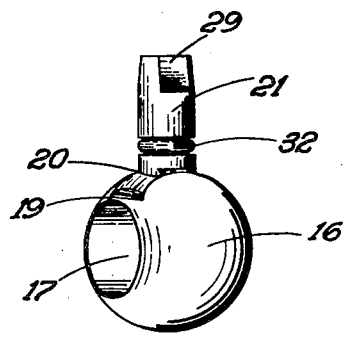
FIGURE 3 is a view of the valve ball detached with the valve stem in place.
Figures 4, 5:
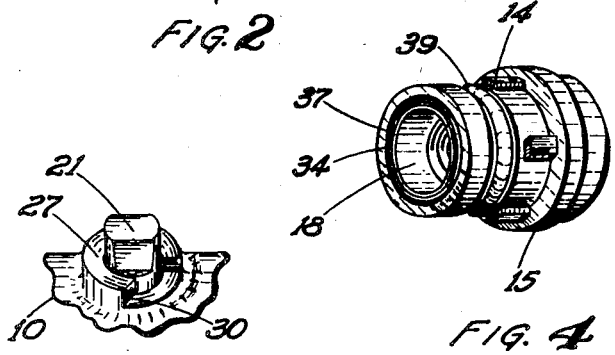
FIGURE 4 is a detached view of one valve end connector with the ball seal and O-ring type seal in place.
FIGURE 5 is a detail section of the valve stem boss showing the stop cut out for the stem handle and stem in place.

The valve body 10 contains a longitudinal through opening 11 extending throughout the entire length of the valve body 10, and a side opening 12 extending into the longitudinal opening 11 from the upper side of the valve body 10. Each end of the valve body 10 is provided with a series of evenly spaced lug indentations 13 adapted to receive lugs 14 on circular end connectors 15 as described hereinafter.

The valve ball 16 is located in the middle of the valve body 10. The ball 16 is centrally bored to produce a flow passage 17 through the center of the ball 16 which is registerable with longitudinal flow passages 18 of the end connectors 15. The upper portion of the ball 16 is cut out to form a slot 19, extending parallel to the flow passage 17, with side walls having a taper converging outwardly away from the center of the ball 16. The slot 19 engages the inner end 20 of the stem 21, which has a taper matching that of the side walls of the slot 19 and is inserted in the slot from one side of the slot to form an interlocking key arrangement.

This interlocking key arrangement serves two purposes. First, it permits the stem 21 to be assembled in the valve from the inside of the valve body 10, thus providing what may be described as an internally loading stem which is much easier to install in the valve than conventional stems, which are usually assembled in the valve from outside of the valve body. The other purpose of the interlocking key arrangement is to provide a stem which is internally retained from within the valve body, thereby dispensing with conventional bonnets, nuts, bolts, and packing glands which are often complicated in structure and costly to manufacture.

Figure 6:
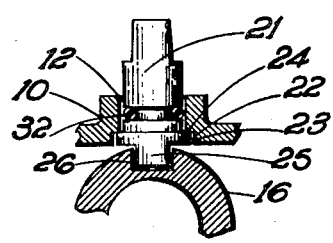
FIGURE 6 is a detail cross section of an alternative stem arrangement including the side opening of the valve with the valve stem in place showing the stem shoulder engaging the counterbore concentric with the stem opening.

It is of course obvious that other types of key arrangements may be employed for the same purposes. For example, another type of key arrangement which is both internally retained and internally loaded consists of a stem 21 having a uniform diameter with a stem shoulder 22 integrally fixed around the diameter of the stem 21 near the inner end 20 of the stem 21, as shown in FIGURE 6. The stem shoulder 22 has a diameter greater than the side opening 12 of the valve body 10. Such a stem can be internally inserted through the opening 11 at one end of the valve body 10 and then extended out through the side opening 12.

The stem shoulder 22 bears against a counterbore 23 in the valve body which is concentric with the side opening 12. The counterbore 23 provides a flat surface 24 against which the stem shoulder rides, thereby preventing the stem from being blown out of the side opening 12 by line pressure. The stem is supported by the inner ending 25 of the stem which is squared to fit a corresponding slot 26 with perpendicular walls cut into the upper portion of the ball 16. Thus, this key arrangement has the same features as the interlocking key arrangement in that it is both internally loaded and internally retained.

To assemble the ball valve illustrated in the drawing, the stem 21 is inserted through the opening at one end of the valve body 10 and is then extended out through the side opening 12 preparatory to being connected with the ball 16, which is inserted next. The stem boss 27 provides support for the middle portion of the stem 21, and has a uniform interior diameter corresponding to the uniform exterior diameter of the middle portion of the stem 21. The ball 16 is rotated between open and closed positions of the valve by rotation of the stem 21. The valve handle 28 fitted on the squared outer end 29 of the stem 21 provides manual control of rotation of the stem 21, but it is obvious that any means of rotation of the stem 21 may be utilized, including mechanized means. Rotation of the stem 21 is limited between extreme open and closed positions of the valve by handle stop cut outs 30 of the top portion of the stem boss 27.

To prevent leakage of material through the side opening, a circular groove 31 adapted to receive a stem seal 32 of the O-ring type or other seal, is provided in the middle portion of the stem 21. This stem seal 32 is highly effective both at low and high line pressures. Any increase in line pressure merely serves to increase the sealing effect of the stem seal 32.

The valve is connected to piping by means of end connectors 15 which are identical in construction. The end connectors 15 contain longitudinal flow passages 18 extending throughout the entire length of the end connectors 15. These flow passages 18 become registerable with the flow passage 17 of the ball 16 when the end connectors 15 are slidably inserted into position at each end of the valve body 10. Possible rotation of the end connectors 15 when in position is prevented by the lugs 14 on the outside of the end connectors which fit into lug indentations 13 at each end of the valve body 10. The interior diameters of the outer ends of the end connectors 15 have threads 33 which mesh with corresponding threads not shown on the ends of piping or other connecting means used to place the valve in service. When the valve is thus placed in service, and the ball 16 is rotated in the open position, a uniform interior diameter is created, through which material can pass in a continuous flow from the outer end of one end connector, through the flow passage 17 of the ball 16, and out the other end connector. In this manner, turbulence in the valve is kept at a minimum, thereby producing maximum flow efficiency through the valve.

The inner ends 37 of the end connectors 15 are annular in shape and have recesses 34 to receive corresponding removable annular ball seals 35. The ball seals 35 may be made of any material of a hardness different, greater or lesser, from that of the ball. Materials may be used which are rigid or resilient, elastomeric or semi-elastomeric. On the other hand, the ball 16 may be constructed of semi-elastomeric materials, such as polytetrafluoroethylene, to be used in conjunction with ball seals 35 which are rigid, or made of a harder material than that of the ball 16.

When the end connectors 15 with the ball seals 35 fitted in the recesses 34, are insterted into position, the ball seals press against the outer surface of the ball on each side, thereby supporting the ball, and creating an annulus 36 of contact between the ball seals and the ball from two directions. Thus, positive pressure seals are provided in either direction of flow of material through the valve. When the valve is in the closed position, sealing efficiency is high since any increase in line pressure will increase the sealing effect by urging the ball 16 against the ball seal 35 that much more strongly in the direction of flow. Thus, the valve shown is capable of withstanding extremely high line pressures without difficulty.

The end connectors 15 serve as retainers for the ball seals 35 and keep the ball seals in position, maintaining pressure on the ball seals 35 which in turn continue to keep the annulus 36 of contact with the ball in effect. It is of course obvious that the annular inner ends 37 themselves of the end connectors 15 may be used to create the annulus 36 of contact with the ball 16, thereby dispensing with the ball seals 35, where the feature of removable ball seals is not desired. No special seats are needed in either case, for both the annular inner ends 37 and the ball seals 35 are independent of seats in carrying out their function.

In the outside circumference of the middle portion of the end connectors 15 are circular grooves 38 provided therein and adapted to receive body seals 39 of the O-ring type or other seal. These body seals 39 prevent any leaking from the valve body 10 when material is flowing in either direction through the valve, and also when the valve is in the closed position. Any increase in line pressure will serve to create a stronger seal in either direction of flow by pressing the body seal 39 that much more firmly into the clearance 40 between the line of contact between the valve body 10 and the end connector 15 in the direction of flow.

While the lugs 14 in conjunction with the lug indentations 13 prevent rotation of the end connectors, linear movement of the end connectors 15 is controlled by means of compensating union seal nuts 41 which are threaded onto corresponding threads 42 on the outer ends of the valve body 10. The lips 43 of the compensating union seal nuts 41 make contact with the circular shoulders 44 of the end connectors and maintain pressure inwardly against the end connectors, thereby serving to keep the end connectors 15 and ball seals 35 pressing against the ball.

To provide for easy adjustment for wear without taking the valve out of service, the union seal nuts 41 may be tightened thereby increasing the pressure of the lips 43 against the shoulders 44 of the end connectors. The increase in pressure will drive the end connectors 15 inwardly toward the center of the valve body 10 and restore any loss of sealing efficiency in the annulus 36 of contact between the ball 16 and ball seals 35 due to wear. In this manner, the compensating union seal nuts 41 together with the linearly movable end connectors 15 provide a simple and quick means for adjustment and take up of the valve to compensate for wear without removing the valve from service.

It is obvious that such compensation may be done with only one end connector in conjunction with one compensating union seal nut. Therefore, the valve may be constructed with only one movable end connector and one compensating union seal nut. The other end connector may be integrally fixed or merged with one side of the valve body, and a second union seal nut may be omitted, without destroying the features of my invention.

From the foregoing, it is evident that the ball valve 16 is self-centering with reference to the seals 35 on the connectors 15 when the valve is in opened position, even though the valve may not be centered, that is, in exact coaxial alignment with the axis of the side opening 12. It is assumed that the ball valve 16 is slightly offset in the opening 11 so that a vertical diametrical axis lies slightly upstream or downstream from the axis of the opening 12 and valve stem 21. It will be observed that, because of the parallel relation of the slot 19 and flow passage 17, the ball valve will become centered between the seals 35 when the valve is opened, and the slot 19 will permit the valve to slide upstream or downstream by relative movement of the inner end 20 (or 25) of the valve stem and the slot 19. When closed, however, the vertical diametrical axis of the valve is forced into coincidence with the axis of the valve stem, thereby moving the valve either upstream or downstream and forcing the imperforate surface thereof tightly against one or the other seals 35, effecting a tight and leakproof seal.

While I have described my invention in detail with reference to the accompanying drawing illustrating the preferred form of my invention, it is understood that numerous changes in the details of construction and arrangement of parts may be made without departing from the spirit and scope of the invention as hereinafter claimed.

I claim:

1. In a valve, the combination of: a tubular body having an axial bore and a lateral opening connected therewith; connecting means carried at each end of said axial bore for connecting the valve into a fluid flow line, said connecting means having a bore providing a flow line forming a part of the flow line through the valve, said connecting means being axially slidable within said body; a ball valve rotatably mounted within said body and engaging the inner ends of said connecting means; sealing means, carried by said connecting means, interposed between the inner ends of said connecting means and said ball valve; said ball valve being of a diameter corresponding to the diameter of the bore in said body, said ball valve having a passage therethrough alignable with the bores in said connecting means for controlling flow through said valve body, said ball valve having a groove in the outer surface thereof parallel with the axis of the passage therethrough; a stem mounted in said lateral opening for rotary and axial movement, said stem having an inner end slidably and non-rotatably received in said groove and including cooperating means between the stem and valve preventing axial movement of the stem relative to the valve; and a coupling and compensating member carried on each end of said body and engaging said connecting means, said coupling and compensating members being movable relative to said body for urging the sealing means on said connecting means into engagement with the ball valve to compensate for wear at the ball valve-sealing means engaging surfaces.

2. The combination defined in claim 1 in which said cooperating means preventing axial movement of the stem relative to the valve comprises an end section on said stem having sides which diverge toward the inner end, and in which the groove in the outer surface of the ball valve includes side walls which converge away from the bottom wall, said end section of the stem fitting within the groove.

References Cited in the file of this patent

UNITED STATES PATENTS

| | | |
|---|---|---|
| 1,327,984 | Campbell | Jan. 13, 1920 |
| 1,846,315 | Crowley | Feb. 23, 1932 |
| 1,906,266 | Hoffman | May 2, 1933 |
| 2,578,396 | Brown | Dec. 11, 1951 |
| 2,696,363 | Monson | Dec. 7, 1954 |
| 2,734,715 | Knox | Feb. 14, 1956 |
| 2,855,177 | Freeman | Oct. 7, 1958 |

FOREIGN PATENTS

| | | |
|---|---|---|
| 28,193 | Great Britain | Mar. 10, 1910 |
| 23,939 | France | Sept. 27, 1921 |
| 759,218 | Great Britain | Oct. 17, 1956 |